(12) United States Patent
Benlloch Baviera et al.

(10) Patent No.: US 10,281,594 B2
(45) Date of Patent: May 7, 2019

(54) GAMMA-RAY COMPTON TOF CAMERA SYSTEM

(71) Applicants: Consejo Superior de Investigaciones Cientificas, Madrid (ES); Universitat Politècnica de València, València (ES)

(72) Inventors: José María Benlloch Baviera, Valencia (ES); Filomeno Sánchez Martínez, Valencia (ES); Antonio Javier González Martínez, Valencia (ES)

(73) Assignees: Consejo Superior de Investigaciones Cientificas (ES); Universitat Politécnica de Valéncia (ES)

( * ) Notice: Subject to any disclaimer, the term of this patent is extended or adjusted under 35 U.S.C. 154(b) by 0 days.

(21) Appl. No.: 15/970,174

(22) Filed: May 3, 2018

(65) Prior Publication Data

US 2018/0252825 A1    Sep. 6, 2018

Related U.S. Application Data

(63) Continuation of application No. PCT/ES2016/070783, filed on Nov. 4, 2016.

(30) Foreign Application Priority Data

Nov. 4, 2015   (ES) .................................. 201531580

(51) Int. Cl.
*G01T 1/20*       (2006.01)
*G01T 1/164*      (2006.01)
(Continued)

(52) U.S. Cl.
CPC .......... *G01T 1/2023* (2013.01); *G01T 1/1642* (2013.01); *G01T 1/17* (2013.01);
(Continued)

(58) Field of Classification Search
CPC ... G01T 1/1642; G01T 1/2002; G01T 1/2006; G01T 1/2018; G01T 1/2023; G01T 1/208; G01T 1/247; G01T 1/248; G01T 1/2985
See application file for complete search history.

(56) References Cited

U.S. PATENT DOCUMENTS 4,124,804 A    11/1978  Mirell
5,783,829 A     7/1998  Sealock et al.
(Continued)

FOREIGN PATENT DOCUMENTS

WO         01/88493 A1    11/2001

OTHER PUBLICATIONS

S. Takeda et al.; Applications and Imaging Techniques of a Si/CdTe Compton Gamma-Ray Camera; Physics Procedia 37 (2012) 859-866—(8) pages.
(Continued)

*Primary Examiner* — Mark R Gaworecki
(74) *Attorney, Agent, or Firm* — Boyle Fredrickson, SC

(57) ABSTRACT

A gamma ray Compton TOF camera system includes multiple detector modules, each comprising a gamma radiation sensitive material and arranged in layers formed by one or more detector modules. The layers are placed such that they interfere an incoming gamma ray in order to completely or partially absorb it after one or more Compton interactions and are spatially separated in order to allow for the determination of the temporal order of each gamma ray interaction inside the camera system. The camera system also includes read out electronics and a Data Acquisition System where signals from the detector modules will be readout, digitized and sent to a processing unit, which is capable to obtain the 3D position, energy and temporal sequential order of the individual interactions produced by a single incident gamma ray.

23 Claims, 7 Drawing Sheets

(51) Int. Cl.
  *G01T 1/24* (2006.01)
  *G01T 1/29* (2006.01)
  *G01T 1/17* (2006.01)
  *G01T 1/202* (2006.01)
  *G01T 1/208* (2006.01)

(52) U.S. Cl.
  CPC .......... *G01T 1/2002* (2013.01); *G01T 1/2006* (2013.01); *G01T 1/208* (2013.01); *G01T 1/2018* (2013.01); *G01T 1/247* (2013.01); *G01T 1/248* (2013.01); *G01T 1/2985* (2013.01)

(56) References Cited

U.S. PATENT DOCUMENTS

| | | | |
|---|---|---|---|
| 7,573,039 B2 | 8/2009 | Smith | |
| 8,384,036 B2 | 2/2013 | Conti | |
| 8,785,864 B2 | 7/2014 | Ricci et al. | |
| 8,809,791 B2 | 8/2014 | Olivier et al. | |
| 2012/0217386 A1* | 8/2012 | Ricci | G01T 1/20 250/252.1 |
| 2014/0110592 A1 | 4/2014 | Nelson et al. | |
| 2015/0331115 A1* | 11/2015 | Nelson | G01T 1/1611 250/363.03 |
| 2017/0212251 A1* | 7/2017 | Hadjioannou | G01T 1/2008 |
| 2018/0136340 A1* | 5/2018 | Nelson | G01T 1/1644 |
| 2018/0217273 A1* | 8/2018 | Serafino | A61B 6/4417 |

OTHER PUBLICATIONS

Mythra Varun Nemallapudi et al.; Sub-100 ps coincidence time resolution for positron emission tomography with LSO:Ce codoped with Ca; IOP Publishing, Phys. Med. Biol. 60 (2013) 4635-4649—(16) pages.

A. Studen ei al.; First coincidences in pre-clinical Compton camera prototype for medical imaging; Nuclear Instruments & Methods in Physics Research Section A 531 (2004) 258-264—(7) pages.

V. Schönfelder et al., Instrument description and performance of the imaging gamma-ray telescope COMPTEL aboard the Compton Gamma-Ray Observatory; The Astrophysical Journal Supplement Series, 86:657-692, Jun. 1993—(36) pages.

R. Kahora et al.; Advanced Compton Camera System for Nuclear Medicine; Prototype System Study; 2008 IEEE Nuclear Science Symposium Conference Record (M06-173) 3906-3908—(3) pages.

L.J. Harkness et al.; Semiconductor detectors for Compton imaging in nuclear medicine; IOP Publishing for SISSA—9th Intl. Conference on Position Sensitive Detectors, Sep. 12-16, 2011, Aberystwyth, U.K.—(11) pages.

S. Boggs et al.; Report on the Advanced Compton Telescope vision misson study.Technical report; NASA Vision Mission Concept Study Report Dec. 2005—(84) pages.

S. Boggs et al.; Overview of the nuclear Compton telescope; New Astronomy Reviews 48 (2004) 251-255—(5) pages.

* cited by examiner

GAMMA-RAY COMPTON TOF CAMERA SYSTEM

TECHNICAL FIELD OF THE INVENTION

The present invention lies in the field of imaging and more specifically in the field of gamma ray imaging. The invention relates to the design of devices capable of detecting gamma radiation and obtaining information therefrom, for example medical devices as used in Nuclear imaging systems like Single-Photon Emission Computed Tomography (SPECT) or Positron Emission Tomography (PET) for the purpose of medical diagnosis or as dose monitoring during irradiation in hadron therapy.

However it is to be understood that the present invention is also applicable in many other technical fields, as for example in astrophysical gamma ray telescopes, monitoring of decommissioning of nuclear power plants and homeland security.

BACKGROUND OF THE INVENTION

Compton Cameras have been used in the past, mainly in the gamma ray astrophysics field, to determine the energy and position in the sky of high energy celestial gamma ray emitters (Schönfelder, V. et al., "Instrument description and performance of the imaging gamma ray telescope COMP-TEL aboard the Compton Gamma-Ray Observatory." The Astrophysical Journal Supplement Series, 88: 657-892, 1993, Boggs, S. et al., "Overview of the nuclear Compton telescope." New Astronomy Reviews, 48:251-256, 2004). More recently these kind of devices have been proposed for Nuclear Medicine imaging diagnostic purposes as they allow to reconstruct gamma ray emitting radioisotope distributions (Kahora, R. et al., "Advanced Compton camera system for nuclear medicine: Prototype system study." Nuclear Science Symposium Conference Record, 2008, Harkness, L. J. et al., "Semiconductor detectors for Compton imaging in nuclear medicine", 2012 JINST 7 C01004.). Compton cameras based on Si or CdTe have been recently proposed (Studen, A. et al., "First coincidences in pre-clinical Compton camera prototype for medical imaging." Nucl. Instr. & Meth. 531 (2004) 258-264, Takeda, S. et al., "Applications and Imaging Techniques of a Si/CdTe Compton Gamma-Ray Camera." Physics Procedia 37 (2012) 859-868.) due to the excellent energy resolution of semiconductor technology. However, semiconductor time resolution is very poor and does not allow for a sequential development of the whole gamma ray interactions.

All these devices, including the present invention, are based on the determination of the impact position of gamma ray interactions due to Compton scattering (FIG. 1). Compton scattering dominates the gamma ray detection process for energies between 150 keV and 5 MeV.

However, the most important limitation of current Compton cameras is that the timing resolution of the current systems does not allow one to determine the temporary order of the detected interactions on the different layers, of which the modules of these cameras are made. In fact, one of the major challenges of analyzing data from a combined Compton camera is the reconstruction of the parameters of each original gamma ray from the measured data, which consist only of several energy and position measurements.

For the complex task of Compton temporal sequence reconstruction, the detailed description of a dedicated multidimensional event data space naturally leads to a discussion of possible event quality selection criteria and their applicability to different event types, thus being very demanding from the computing point of view, while still producing low quality images. Recently Compton cameras with recoil electron tracking capabilities have been proposed (Boggs, S. et al., "Report on the Advanced Compton Telescope vision mission study. 'Technical report", NASA, 2005.), allowing the incident gamma ray direction to be confined inside a reduced cone arc region. However, these newly developed Compton cameras still lack the necessary timing accuracy information for efficiently determine the Compton temporal sequence, in U.S. Pat. No. 4,124,804 A "Compton scatter scintillation camera system" by S. Mirell, a method and apparatus for producing tomographic or cross-sectional radiographic images, from which the radiation is substantially confined to a single plane, and a conventional scintillation camera located to detect gamma radiation scattered from the object is presented, in Patent US 20140110592 A1 "Compton camera detector systems for novel integrated compton-Pet and CT-compton-Pet radiation imaging" by R. S. Nelson and W. B. Nelson, a novel Compton camera detector designs and systems for enhanced radiographic imaging with integrated detector systems which incorporate Compton and nuclear medicine imaging, PET imaging and x-ray CT imaging capabilities is described.

In U.S. Pat. No. 7,573,039 B2 "Compton camera configuration and imaging method" by B. D. Smith an approach for the selection of Compton camera shapes, configurations, positions, orientations, trajectory paths, and detector element sets is provided for collecting data for analysis using the surface integral and integral-of-line-integral methods of reconstruction Compton data. In U.S. Pat. No. 8,384,036 B2 "Positron emission tomography (PET) imaging using scattered and unscattered photons" by M. Conti TOF (time-of-flight) difference is obtained between the two gamma rays produced after positron annihilation. However, only those coincidence events where a full-energy gamma ray is detected at a first detector and a partial-energy scattered gamma ray is detected at a second detector is considered in that Patent. In U.S. Pat. No. 8,785,864 B2 "Organic-scintillator Compton gamma ray telescope" by Kenneth N. Ricci et al. an apparatus and methods for imaging sources of gamma rays with a large area are described, and comparatively low-cost Compton telescope is claimed, in U.S. Pat. No. 8,809,791 B2 "Continuous time-of-flight scatter simulation method" by P. Olivier and P. Khurd a method for correcting PET imaging data by simulation of time-of-flight scatter is presented.

However, none of the designs presented in these patents allow one to determine the complete timing sequence of the detected interactions produced by a single incident gamma ray.

The inability of current Nuclear Medicine devices to include Compton scattered events without degrading image quality is the most serious handicap to increase sensitivity in commercial scanners (PET and SPECT). This is due to the fact that current designs do not allow one to properly determine the order of the detected interactions produced by a single incident gamma ray within the gamma ray detector volume.

When dealing with PET scanners, the current technology focuses in detecting photoelectric events since the position of the first interaction in Compton events is unknown, and also it is not possible to distinguish Compton events in the detector from Compton events occurring inside the body. Therefore, events that lie outside the photoelectric peak are rejected because they produce noise and blurring in the image. However, these could amount to more than 50% of the events. Since PET works in coincidence mode, the probability for detecting two photoelectric events is less than 25% (of the order of 20%). Therefore, a factor 5 in sensitivity could be gained if Compton events are recovered.

PET Image quality is limited due to several factors including Compton scattered events inside the human body. Compton scattered events inside the body with the current technology are rejected through energy window around the photoelectric peak. The contribution of scattered events inside the photoelectric peak coming from scatter at the crystal or at the human body can currently only be estimated and corrected. The proposed invention will significantly improve image quality by a more efficient elimination of random and scattered events. The timing resolution of the current invention will be used to directly reject random events. Moreover, Compton and photoelectric temporal sequence events detection will be used to further eliminate scattered events inside the human body and random events by analysis of the kinematics of the whole positron-electron annihilation event.

BRIEF DESCRIPTION OF THE INVENTION

The present invention describes a gamma ray Compton TOF camera system capable to obtain the 3D position and energy of the interactions (Compton and photoelectric) and their relative timing by means of accurate determination of the TOF for each interaction. The combination of geometrical design and high timing resolution of the system of the invention will allow determination of the full temporal sequence of all gamma ray interactions inside the detector, including Compton interactions.

With the present invention the timing information will allow to fully determine the Compton+photoelectric temporal sequence. For these reasons, a real breakthrough in the Compton dominated energy regime can be achieved by an instrument able to efficiently record events resulting from Compton scattering. We assume that the incident gamma ray with energy E0 is completely absorbed and deposits energy E1, E2, and E3 in detectors 1, 2 and 3 (FIG. 1) at times t1, t2 and t3 respectively. Once the locations, timing sequence and energies of the interactions are measured, the Compton kinematic allows us to calculate the energy and direction (as a cone) of the incident gamma ray following the Compton equation:

$$\cos\theta = 1 - m_e c^2 \left(\frac{1}{E_2+E_3} - \frac{1}{E_1+E_2+E_3}\right) \quad (1)$$

The above equation can be easily extended if 2 or more than 3 interactions take place in the different detector modules.

The present invention will allow to recover Compton events, including them into the image reconstruction, thus increasing overall sensitivity.

The present invention will improve image quality of current Nuclear Medicine scanners due to a much more efficient way of random and Compton scattered event rejection.

This will change the situation of current scanners that 1) reject events that involve Compton scattering due to their lack of time information with sufficient accuracy (whereas with the present invention such events are recovered and used for the image reconstruction) and 2) at the same time current scanners accept events that involve Compton scattering in the patient for example, whereas with the present invention these events will be rejected.

Even for SPECT the present invention will allow to further reduce background produced by Compton scattered (both in the body and/or collimator) and external body environment contribution.

On the other hand, individual measurement of the TOF for each interaction of the gamma ray event will improve the image quality. Since, the different TOF measures are connected through the well known physics evolution of gamma ray event interactions, it is possible to relate them easily through simple equations. For instance, if first gamma interaction happened at position x1,y1,z1 and time t1, and second gamma interaction happened at position x2,y2,z2 and time t2, the delay time between these gamma ray interactions should be:

$$t_2 - t_1 = \sqrt{(x_2-x_1)^2 + (y_2-y_1)^2 + (z_2-z_1)^2}/c \quad (2)$$

where c is the speed of light. Therefore, if these interactions actually belong to the same event, then they have to accomplish the above equation. Otherwise, they are produced by different incident gamma ray events. Thus the application of the above equation should contribute to the reduction of events producing fake LORs (lines of response) in PET and a reduction in background contribution to any device based on this invention (i.e. PET, SPECT, gamma ray astronomy telescopes, monitoring of decommissioning of nuclear power plants, homeland security among others).

Each original gamma ray can undergo several interactions in a sequential manner, giving raise after each one of these interactions to a new gamma ray with different energy and direction. According to the present invention the TOF is measured for each one of these interactions, pertaining all of them to the same event, generated by a single incident gamma ray. A key aspect of the invention is the differentiation between interaction and event, according to the definitions given below.

The proposed invention will allow a sensitivity increase of Nuclear Medicine devices that will imply a further reduction for the radioisotopes dose administered to a patient improving at the same diagnostic capability through the improved quality of the acquired image.

coupled to photosensors (2) on one of the WLS fiber ends, while the other of the larger scintillator surfaces—opposite to the mentioned one—is covered by the reflector surface (5).

Figure 6:
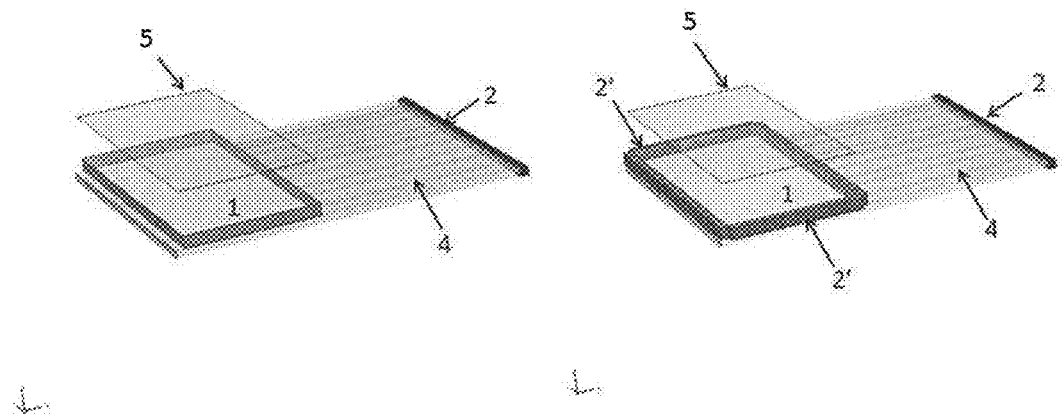
FIG. 6 shows one detector module that has one of its larger scintillator surfaces covered with WLS fibers (4)
Figure 7:
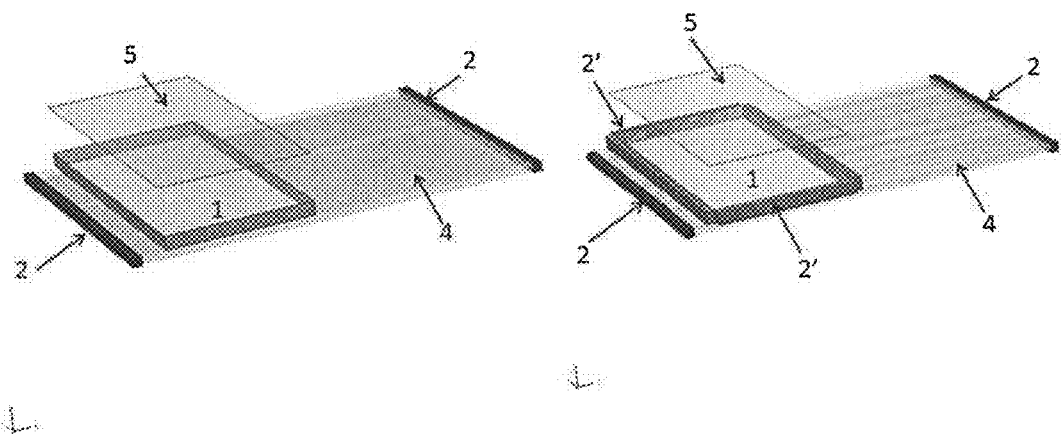

FIG. 7 shows another embodiment similar to the one of FIG. 6, but the detector module has one of its larger scintillator surfaces covered with WLS fibers (4) coupled to photosensors (2) on both WLS fiber ends.

Figure 8:
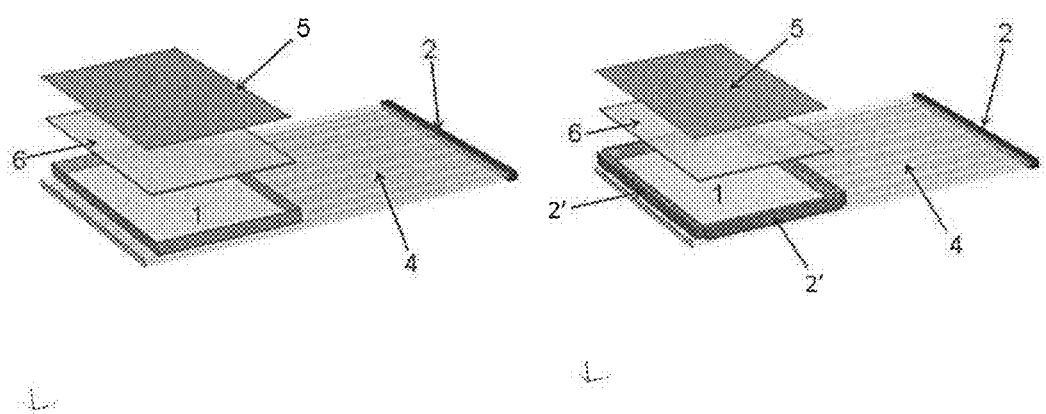

FIG. 8 shows a detector module having one of its larger scintillator surfaces covered with WLS fibers (4) coupled to photosensors (2) on one of the WLS fiber ends, while the other one of the larger scintillator surfaces is covered by a faceplate (6) optically coupled between the reflector surface (5) and the scintillator face.

Figure 9:
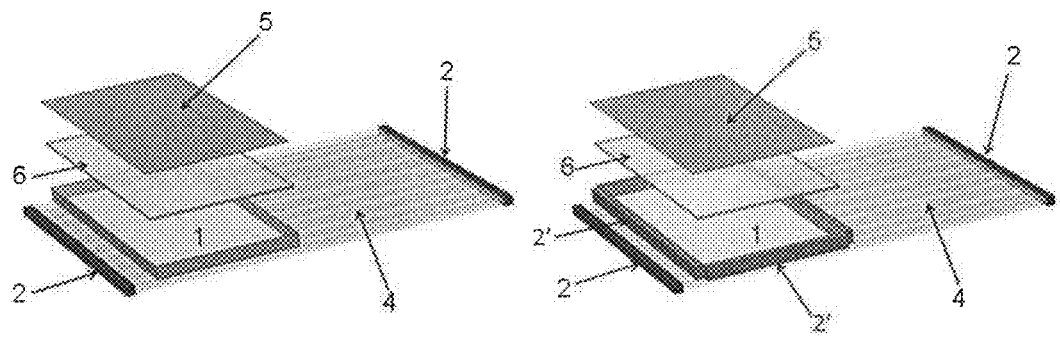

FIG. 9 shows another embodiment similar to the one of FIG. 8, but the detector module has one of its larger scintillator surfaces covered with WLS fibers (4) coupled to photosensors (2) on both WLS fiber ends.

Figure 10:
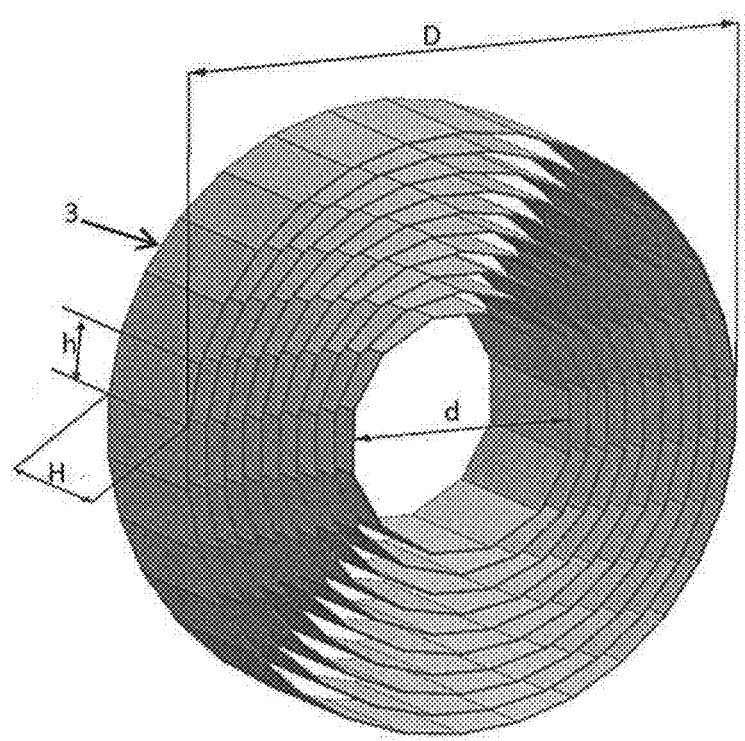

FIG. 10 shows a Positron Emission Tomography device according to the invention wherein the detector modules form concentric cylinders surrounding an object under study.

Figure 11:
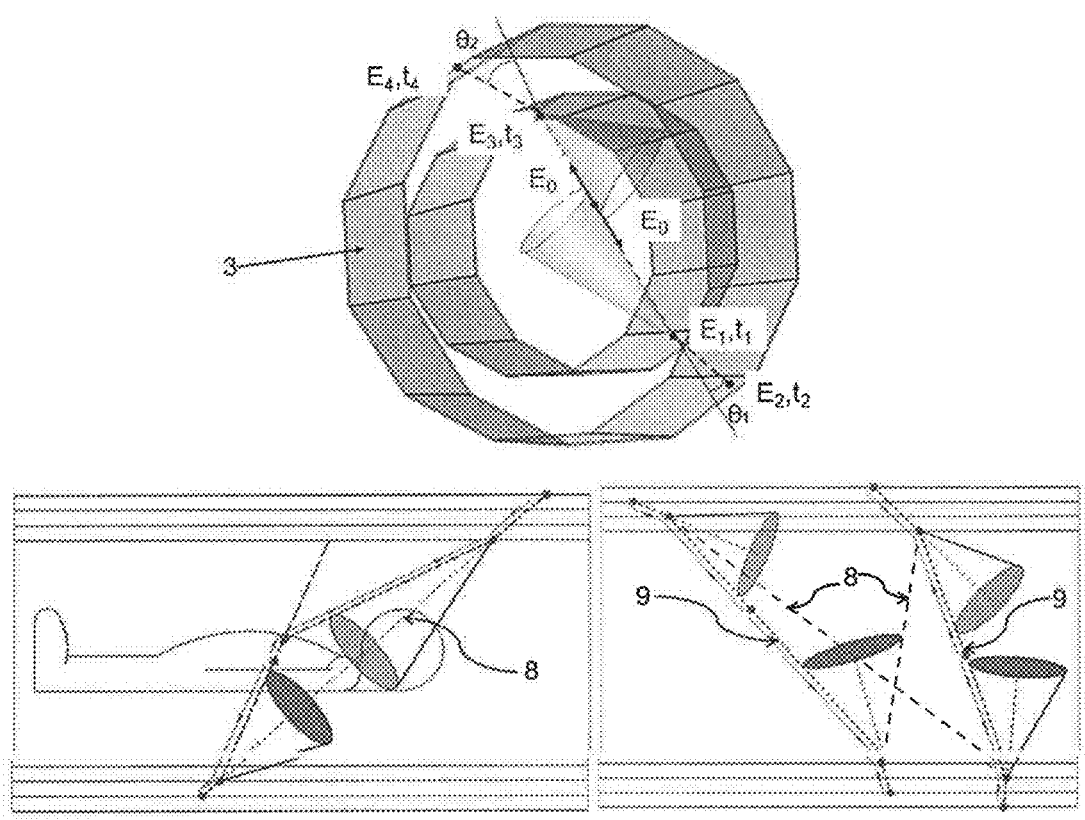

FIG. 11 shows a Compton cone angle in PET and how true coincidence events can be properly managed, no matter if they have suffered scatter in the body or in the detector module (Up).

FIG. 11—Down Left—: Coincidence event in which one of the gamma rays has suffered scatter inside the human body.

FIG. 11—Down Right Random coincidence event in which two positron interactions coincide in time by chance.

DETAILED DESCRIPTION

The invention will be described in more detail below with reference to the figures because they are illustrative of the different embodiments and are helpful to understand the invention.

The present invention is characterized essentially in that the gamma ray detector is designed to distinguish in space and time between different gamma ray Compton and photoelectric interactions inside the gamma ray detector by measuring their 3D impact position and time, and recording this information to be analyzed later.

Definitions

"monolithic crystal", "monolithic scintillator crystal", "continuous crystal" and "continuous scintillator crystal" are used indistinctly.

"Detector module" refers to a structure, planar or curve, preferably planar or laminar shaped, comprising any gamma radiation sensitive material. Detector modules according to the invention can have any desired shape, such as polygonal shape, and any size. However, unless otherwise specified, when reference is made to particular embodiments, the detector modules have a parallelogram—for example, rectangular-shape, wherein we distinguish two "larger surfaces" as the flat larger surfaces and four "thinner side surfaces" or "thinner edge surfaces" as the side edges.

"larger surface", "larger scintillator face", "scintillator face", "scintillator surface" and "larger scintillator surface" are used indistinctly when reference is made to the larger surfaces of a detector module comprising scintillation material "interaction": each of the impacts that a single incident gamma ray undergoes against a surface such as a detector module, "event" defines the total number of interactions that a single incident gamma ray undergoes until its energy is completely or partially lost, "light reflector surface" and "optical reflector surface" are synonyms.

"gamma ray detector" and "gamma ray detector volume" are used indistinctly.

"temporal order" and "timing sequence" are expressions used indistinctly.

Figure 1:
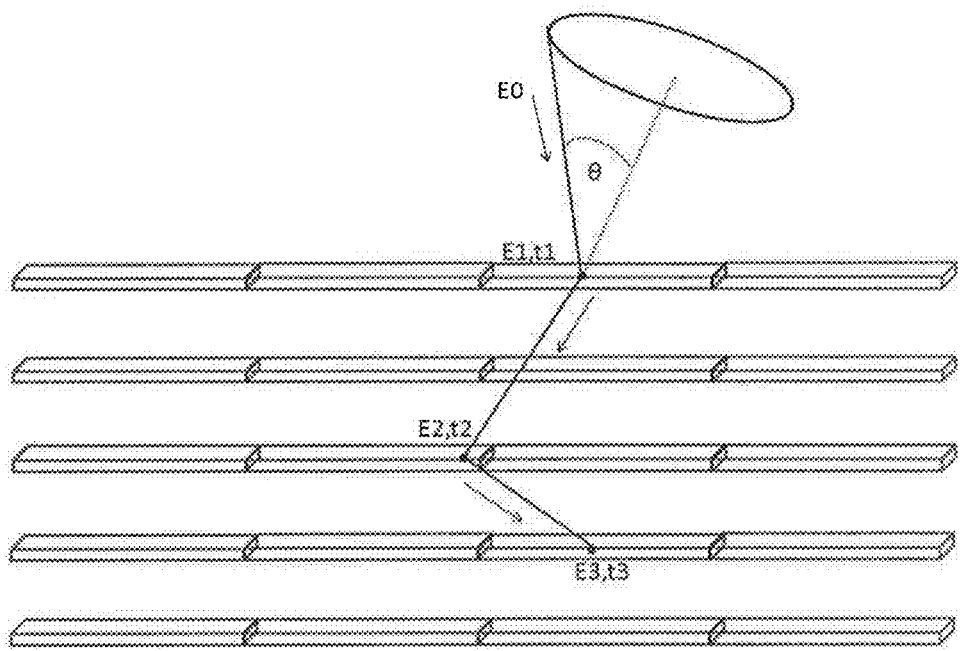
FIG. 1 shows the impact position of gamma ray interactions due to Compton scattering.

The present invention refers to a gamma ray Compton TOF camera system comprising:

a plurality of detector modules (3), each detector module comprises a gamma radiation sensitive material, preferably a scintillator crystal (1), for example, as shown in FIG. 1, said detector modules (3) are arranged in layers formed by several individual detector modules, or by sets of detector modules, said layers are placed in such a way that they interfere an incoming gamma ray, in order to completely or partially absorb it after one or more Compton interactions, and are spatially separated in order to allow for the determination of the temporal order of each gamma ray interaction inside the camera system, read out electronics and Data Acquisition System where signals coming from the detector modules (3) will be readout, digitized and sent to a processing unit for further analysis, and that is capable to obtain the 3D position, the energy and the temporal sequential order of the individual interactions—Compton and photoelectric-produced by a single incident gamma ray, allowing the determination of the full timing sequence of all gamma ray interactions inside the gamma ray detector volume.

The detector modules comprise exclusively a gamma radiation sensitive material in the case of using solid state detectors, and it additionally comprises photodetectors in the case of using scintillator crystals and/or Cherenkov radiators.

The present invention also refers to a gamma ray Compton TOF camera system according to any of the dependent claims.

According to particular embodiments of the gamma ray Compton TOF camera system of the invention, at least one detector module comprises scintillation crystal (1) as gamma radiation sensitive material, optically coupled to arrays of photosensors (2).

The photosensors (2) may be coupled to the scintillation crystal (1) through at least one of the thinner side surfaces of each scintillation crystal (1).

The scintillation crystal (1) can be a monolithic scintillation crystal or a pixelated scintillation crystal. In a Compton TOF camera according to the invention the defector modules comprising a monolithic scintillation crystal, can be combined with detector module comprising a pixelated scintillation crystal, or all the detector modules can be identical with regard to their composition and/or structure.

Each detector module can be adjacent to another one in a specific set and each set be arranged with respect to another set forming a layered structure, that can have the aspect of a closed structure as in FIG. 10, or an open structure. With said arrangement according to FIG. 10, each set of detector modules corresponds to a layer. The layers are separated from each other by a distance ranging from several millimeters to several centimeters as mentioned above.

In the system of the invention a set of detector modules can be formed by two or more detector modules (3), depending on the size of the device and the needs imposed by the intended use. For example, in FIG. 10 the smallest set of detector modules is the one forming the dodecagon in the center, including twelve detector modules, whereas in the outermost set corresponding to the tenth layer the number of detector modules is considerably higher.

The detector modules in a specific particular set can be identical or different. Sets of detector modules in a gamma ray Compton TOF camera system according to the invention can be identical or different with regard to number and shape of detector modules as well as with regard to the composition and/or structure of the detector modules.

The detector modules in a set can be identical with regard to their shape, or different. They can be planar or curve, although planar are preferred. They are always placed in such a way they interfere the incoming gamma ray, trying to completely absorb it after one or more Compton interactions. The way the detector module sets are placed can be, for example, parallel to each other, but other configurations are possible as long as they reach the objective mentioned herein.

The detector modules may have any polygonal shape, preferably parallelogram, and more preferably they have a rectangular shape.

Figure 4:
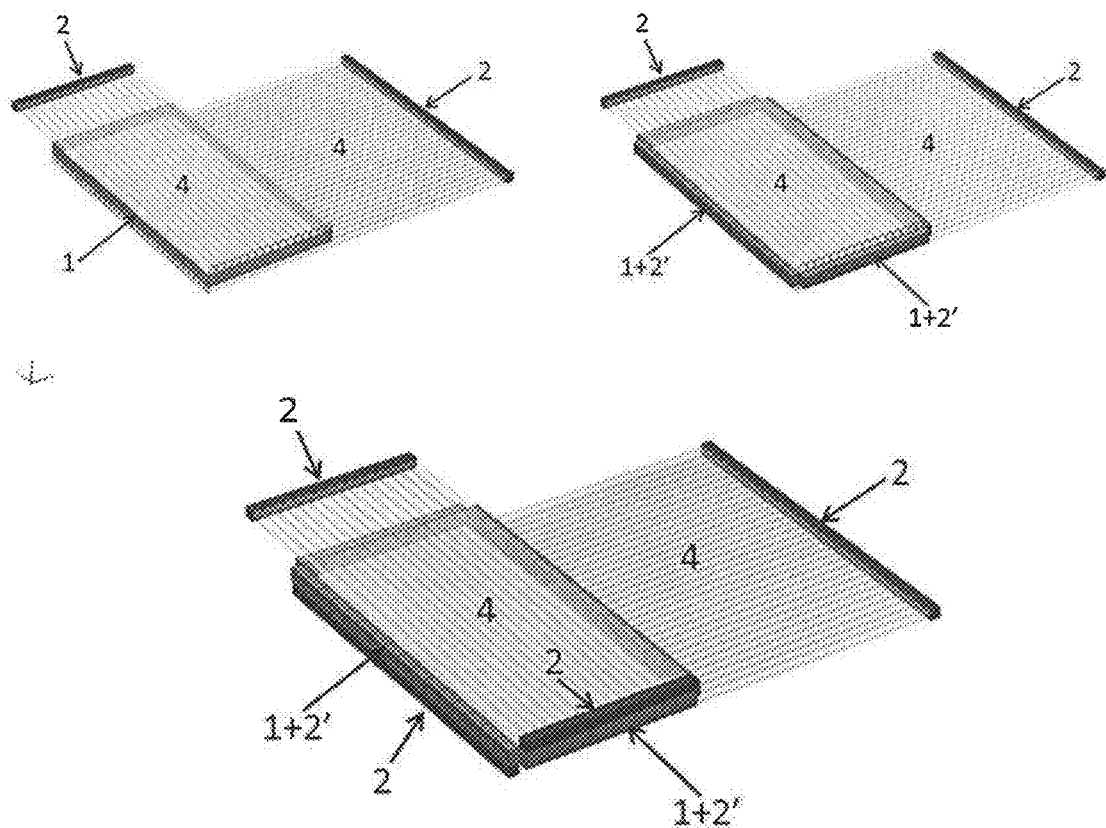
FIG. 4 shows WLS (Wave Length Shifter) fibers (4) that may be used to drive the light from the different scintillator layers (1) towards the photosensors (2).

In particular embodiments of the gamma ray Compton TOF camera system of the invention the photosensors are coupled to the detector modules through at least one of the faces of the module detectors, In case the detector modules have a parallelogram shape they are coupled to photosensors through at least one of the side (surface) edges (thinner surfaces) or to at least one of the larger surfaces. The photosensors can be placed on both side edges of a detector module, or through one or both of the larger surfaces or combinations of any of these mentioned alternatives. When the photosensors are placed on the "larger surfaces" it is preferred that they are coupled through light guides, as shown in FIG. 4.

The gamma ray sensitive material in the detector modules can be of any type. The detector modules or the sets of detector modules in a system according to the invention can comprise the same gamma ray sensitive material or different materials.

Materials as solid state detectors for the gamma ray sensitive detector volume can be used, provided their decay time is fast enough to provide accurate timing information, it is also desirable that the gamma ray detector be built of a material with lower atomic number (Z) in order to favour the Compton interaction of the impinging gamma ray within its sensitive volume.

Examples of solid state detectors are semiconductors as Si, Ge, CdTe, GaAs, $PbI_2$, $HgI_2$, CZT, or HgCdTe (also known as CTM). Cherenkov radiators such as $PbF_2$, NaBi $(WO_4)_2$, $PbWO_4$, $MgF_2$, $C_6F_{14}$, $C_4F_{10}$, silica aerogel can be used. Also scintillators can be used such as organic crystal scintillators, inorganic crystal scintillators, liquid scintillators or gas scintillators. Scintillators can produce a detector signal that is due to both scintillation and Cherenkov processes. The invention is not limited to the read-out and processing by the DAQ of the light produced by the scintillator process, as if is so far usually done. The Cherenkov light component can also be processed in the same way as the scintillation light, and used for accurate determination of the time at which the interaction occurs.

For example, the detector modules cars comprise organic crystal scintillators such as anthracene, stilbene, naphthalene, liquid scintillators (for example organic liquids as p-terphenyl($C_{18}H_{14}$), 2-(4-Biphenylyl)-5-phenyl-1,3,4-oxadiazole PBD ($C_{20}H_{14}N_2O$), butyl PBD ($C_{24}H_{22}N_2O$), PRO ($C_{15}H_{11}NO$) dissolved in solvents such as toluene, xylene, benzene, phenylcyclohexane, triethylbenzene, or decalin), gas scintillators (such as nitrogen, helium, argon, krypton, or xenon), inorganic crystal scintillator, or combinations of any of them, "Combination" means that one detector module— or several of them—can be made for example of an inorganic crystal scintillator and another one—or other ones— can comprise a liquid scintillator.

The commonly known scintillation crystals, for example, cesium iodide (CsI), thallium doped cesium iodide (CsI (Tl)), bismuth germinate (BGO), thallium doped sodium iodide (NaI(Tl)), barium fluoride ($BaF_2$), europium doped calcium fluoride ($CaF_2(Eu)$), cadmium tungstate ($CdWO_4$), cerium doped lanthanum chloride (LaCb(Ce)), cerium doped lutetium yttria silicates (LuYSiOs(Ce) (YAG(Ce)), silver doped zinc sulfide (ZnS(Ag)) or cerium(III) doped yttrium aluminum garnet $Y_3Al_5O_{12}$(Ce), LYSO, can be used. Additional examples are CsF, KI(Tl), $CaF_2$(Eu), $Gd_2SiO_5$[Ce] (GSO), LSO.

The scintillators used in any of the herein described embodiments, and in general, the scintillators according to the present invention, can be monolithic crystals or pixelated crystals, or combinations of them. Preferably the scintillator however is a mono crystal, since pixelated crystals introduce more dead space areas in the gamma ray detector, thus providing less sensitivity of the detector as compared to mono crystals.

According to particular embodiments the monolithic scintillation crystal is selected from LaBr3(Ce) or liquid Xe or combination of them for the different detector modules (3).

According to additional particular embodiments the monolithic scintillation crystal is selected from LaBr3(Ce) for one or more module detectors and LYSO for other detector modules.

The photosensors (2) can be arrays of SiPms, single photon avalanche diodes (SPADs), digital SiPms, avalanche photodiodes, position sensitive photomultipliers, photomultipliers, phototransistors, photodiodes, photo-ICs or combinations of them for the different detector modules (3). This means that a detector module may be coupled, for example, to an array of SiPms and another detector module may be coupled to an array of phototransistors in a system according to the invention. Alternatively all the detector modules can be coupled to the same type of photosensors.

In particular embodiments of the system according to the invention, those where the detector modules comprise scintillator crystals, wave length shifters—WLS—can be used. According to particular embodiments at least one of the detector modules comprsise a scintillator crystal, preferably a rectangular scintillator crystal, comprising Wave Length Shifter—WLS—fibers (4) coupled to one or several of the scintillator surfaces to drive the light from the scintillator crystal (1), towards the photosensors (2).

According to additional particular embodiments, those where the detector modules comprise scintillator crystals, at least one of the detector modules has one or both of its larger scintillator surfaces optically coupled to a reflector surface (5). Moreover, for these embodiments a faceplate (8) can be, optionally, optically coupled between the reflector surface (5) and any of the larger scintillator surfaces.

The function of the reflector surface is to reflect the light reaching the scintillator surface with which it is in contact, so that the photosensors can detect this light. The reflector surface can be any reflector surface such as an optical reflector surface.

The faceplate, also called fiber optic faceplate, is a surface or sheet made of tiny optical fibers, that have the function of transmitting only the light that complies with a specific requirement with regard to the incidence angle. Thanks to its design, only photons with an incidence angle below a critical value (that depends on the faceplate type and refraction index of the medium the faceplate is coupled to) are transmitted. The function of the faceplate is therefore to limit the angle of acceptance of the light produced by the scintillator. Also they can be used to avoid the edge effect in the light produced by the scintillator crystals.

According to additional particular embodiments, at least one of the detector modules comprises a scintillator material, preferably a scintillator crystal, and has one of its larger scintillator surfaces covered with WLS fibers (4) coupled to photosensors (2) on one or both WLS fiber ends, while the other one of the larger scintillator surfaces—opposite to the mentioned one—is covered by the reflector (5) (FIG. 8-7). For these particular embodiments, at least one of the detector modules can have both of its larger scintillator surfaces covered with WLS fibers (4) coupled to photosensors (2) on one or both WLS fiber ends.

Figure 5:
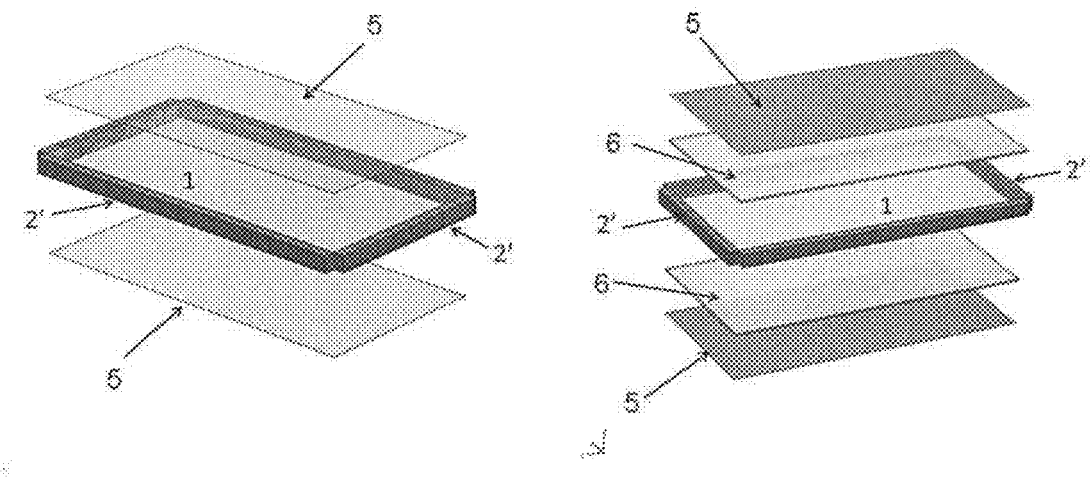
FIG. 5 shows another embodiment of the invention wherein the larger scintillation surfaces of detector modules are optically coupled to a reflector surface (5) and optionally, a faceplate (6) can be optically coupled between the reflector surface (5) and the scintillator face.

In other embodiments of the invention (FIG. 5), those where the detector modules comprise scintillator crystals, one or both of the larger scintillation surfaces of at least one detector module are optically coupled to a reflector surface (5), for example, a retroreflector. Optionally, for these embodiments, a faceplate (6) can be optically coupled between the reflector surface (5) and the scintillator face (FIG. 5).

According to additional particular embodiments, those where the detector modules comprise scintillator crystals, at least one of the detector modules has one of its larger scintillator surfaces covered with WLS fibers (4) coupled to photosensors (2) on one or both WLS fiber ends, while the other one of the larger scintillator surfaces is, optionally, covered by a faceplate (6) optically coupled between the reflector (5) and the scintillator face, as shown in FIGS. 8 and 9.

According to additional particular embodiments, the reflector surface (5) present in at least one of the detector modules is selected between a retroreflector and a light absorbing surface.

The present invention also refers to a device for imaging gamma radiation comprising a gamma ray Compton TOF camera system as defined above.

According to particular preferred embodiments, said device is a Positron Emission Tomography device.

According to additional particular embodiments, said device is a Single Photon Emission Computed Tomography Device (SPECT). A Positron Emission Tomography device according to the invention may have detector modules forming concentric cylinders surrounding an object under study, as shown in FIG. 10, or the detector modules may form concentric cylinders which are not closed—open geometry—.

There might be different implementations of the invention but the main feature for all of them is that all Compton and photoelectric interactions can be distinguished in space and time.

According to additional particular embodiments of the invention, photosensors are connected to read out electronics and Data Acquisition System (DAQ) where signals coming from the detection modules will be readout simultaneously, digitized and sent to the processing unit for further analysis. The position of the interaction point can be determined from the light distribution produced at the scintillator crystal.

The present invention may be used to implement MRI compatible PET or SPECT detectors as the photosensors can be either located outside the sensitive region of the MRI (if WLS+PSPMT configuration is used) or can be placed even inside the MRI sensitive region where the strong magnetic fields produced by the MRI are present (in this case SiPMs and/or APDs can be used as photosensors).

The time-of flight according to the present invention and for any embodiment thereof, can be obtained using conventional methods known in the art. For example article Phys. Med. Biol. 60 (2015) 4635-4849, "Sub-100 ps coincidence time resolution for positron emission tomography with LSO: Ce codoped with Ca", by Stefan Gundacker et. al. discloses how to obtain the timing sequence of all the interactions undergone by a single incident gamma ray.

Different aspects and embodiments of the invention are illustrated in the figures that are described with a greater detail hereinbelow:

FIG. 1: In this figure we show a schematic view of a Compton TOF camera comprising several layers—each one formed by a set of detector modules—in which the gamma ray undergoes multiple Compton scatterings. The thickness of each layer depends on the scintillation material and on the energy of the gamma ray and can vary from mm range to centimeter range (i.e. about 3 mm thickness if LaBr3(Ce) is used). Notice that although in FIG. 3 interaction positions are shown, the conceptual design does not change at all and can be easily extended if only 2, or more than 3, interactions take place in the different detector modules. Current state of the art Compton cameras do not allow to timing sequence determination of these interactions.

Each detector module can be adjacent to another one in a specific set and each set be arranged with respect to another set forming a layered structure as shown in this figure, or can have the aspect of a closed cylindrical structure as in FIG. 10, or an open structure.

In the system of the invention a set of detector modules can be formed by two or more detector modules (3), depending on the size of the device and the needs imposed by the intended use. In FIG. 1 one can see five detector modules in each set, or layer. For example in FIG. 10 the smallest set of detector modules is the one forming the dodecagon in the center, including twelve detector modules whereas in the outermost set corresponding to the tenth layer the number of detector modules is considerably higher.

Figure 2:
FIG. 2 shows a modular design of a gamma ray detector. The invention is based on a modular design (FIG. 2, element 3).

FIG. 2: Detector Module Concept. In one of the preferred configuration as shown in FIG. 2, each detector module (left, 3) consists of a single monolithic (also called continuous) scintillator crystal (FIG. 2, right, element 1) coupled to photosensors (FIG. 2, right, element 2) to read-out the light produced in the crystal by the gamma ray interaction. The monolithic scintillator crystal can comprise any of the materials mentioned above, in a preferred configuration, the monolithic scintillator crystal (1) will comprise LaBr3(Ce) and it will be surrounded at the thinner side surfaces (side edges) by arrays of SiPM pixels as photosensors (2). The combination of fast decay and high light output scintillator together with the fast light read-out produced by SiPMs photosensors will assure the ability of the proposed invention to fully determine the Compton+photoelectric sequence of the incident gamma ray, both in space and time.

Figure 3:
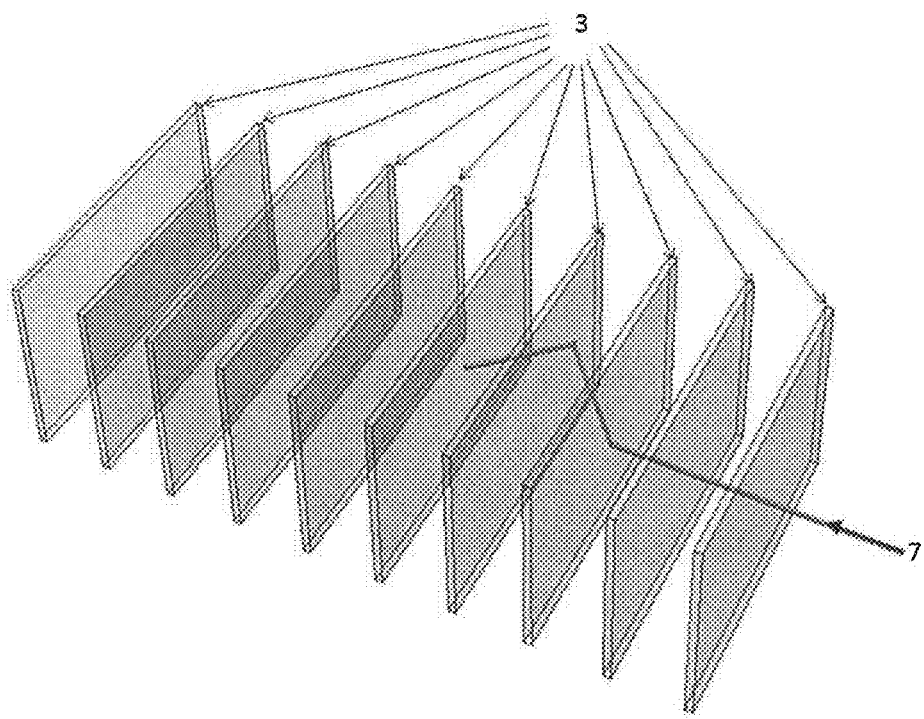
FIG. 3 shows one of the preferred Compton camera time-of-flight configurations of the present invention in which all detector modules (3) are identical and placed in such a way they interfere the incoming gamma ray (7), in order to completely absorb it after one or more Compton interactions.

FIG. 3: In this figure we show one of the preferred Compton camera time-of-flight configurations in which all defector modules (3) are identical and placed in such a way they interfere the incoming gamma ray (7), in order to completely absorb after one or more Compton interactions the incident gamma ray. The thickness of these detector modules layers, or individual detector modules, is selected in order to minimize the occurrence of multiple Compton scattering in the same detector module from the same incoming gamma ray (i.e. about 3 mm thickness if $LaBr_3$ (Ce) is used as scintillator). However, the preferred thickness range in this case can vary between 1 mm up to 4 mm. Nevertheless, it should be mentioned that the preferred thickness depends on the scintillator material used and energy of the incident gamma ray. For 511 keV incident energy, the preferred thickness range, if another scintillator material apart from $LaBr_3$(Ce) is used, should have the same absorption probability for the gamma ray than that of the above preferred thickness range (1-4 mm) of $LaBr_3$).

The separation distance between two detector module layers can vary in a range that depends on how accurate the time at which the interaction occurs can be measured. It is therefore not appropriate to give numerical values for the range, but it is rather enough to indicate that it varies between millimeter and centimeter magnitude order. In fact, the higher limit will merely be imposed by the camera Compton size whereas the lower limit will be imposed by the device accuracy. For practical reasons (overall detector size and cost) the lower the distance between detector module layers the better, as long as the identification of impact timing order is warranted.

The different detector module layers might be separated, for example, by a distance (from several millimeters to even several centimeters) in order to allow for the determination of the temporal ordering of each gamma ray interaction inside the camera system. The number of module layers of the Compton time-of-flight camera (10 in this Figure) can be varied arbitrarily without limiting the generality of the foregoing.

FIG. 4: Upper Left: In yet another embodiment, WLS (Wave Length Shifter) fibers (FIG. 4, element 4) might be used to drive the light from the different scintillator modules (1) towards the photosensors (2). Some WLS fibers have good properties that not only fit the wavelength emission light with the absorption length but also have very long attenuation light of the reemitted light (typically around 4 meters).

According to this embodiment arrays of SiPMs, APDs or Position Sensitive Photomultipliers (PSPMTs) can be used. Both larger scintillator surfaces of a detector module can be covered by WLS fibers—as in the figure—or according to an alternative embodiment only one of the larger surfaces is covered by WLS fibers.

The WLS fibers might be placed in different configurations to optimise the amount of light collection and the spatial information of the Sight distribution (directly related with the spatial resolution).

The WLS can be made of any material known in the art for this purpose, such as p-terphenyl (PT) and tetraphenyl-butadiene (TPB). The decision about the material dpends on the light generated by the scintillator and the optical window of the photomultiplier used. The thickness of the WLS can vary depending on the size of the Compton camera and the particular needs of the intended use. For example they can be 1.5 mm thick.

Upper Right, FIG. 4b: a hybrid solution can be used for the photosensor configuration, as follows:

WLS can be present on one of the larger scintillator surfaces coupled to the photosensors (here arrays of SiPMs, Digital SiPMs, APDs, Single Photon Avalanche Diodes (SPADs) or Position Sensitive Photomultipliers (PSPMTs) can be used) while arrays of SiPMs, Digital SiPMs, APDs and/or SPADs are used as photosensors (2') all around the thinner edge surfaces, WLS can be present on both—as shown in the Figure—of the larger scintillator surfaces coupled to the photosensors (here arrays of SiPMs, Digital SiPMs, APDs, Single Photon Avalanche Diodes (SPADs) or Position Sensitive Photomultipliers (PSPMTs) can be used) while arrays of SiPMs, Digital SiPMs, APDs and/or SPADs are used as photosensors (2') all around the thinner edge surfaces.

Bottom Center: Photosensors (2) may be placed at both WLS fibers (4) ends to increase the amount of scintillator emitted light that is collected by the system. This configuration maximizes the amount of light transferred from the scintillator (1) to the photosensor devices (2). Alternatively, photosensors (2) may be placed at the end of the WLS fibers (4) ends for the case when only one larger scintillator surfaces is covered by WLS fibers. This embodiment can also be considered without photosensors all around the thinner edge surfaces (2').

FIG. 5: Left: In this figure we show another embodiment of the detector module, in which both of the larger scintillator surfaces are optically coupled to a reflector (5) such as retroreflector. Right: Additionally, a faceplate (6) can be optically coupled between the reflector (5) and the scintillator face. In both cases, the thinner side surfaces of the scintillator are coupled to photosensors (1+2).

FIG. 6: In this figure we show another embodiment, in which one of the larger scintillation surfaces of at least one detector module is covered with WLS fibers (4) coupled to photosensors (2) on one WLS fiber ends, while the other of the larger scintillator surface is covered by the reflector (5). The thinner edge surfaces of the scintillator can be covered (right) or uncovered (left) with photosensors (2).

FIG. 7: In this figure we show another embodiment, in which one of the larger scintillation surface of at least one detector module is covered with WLS fibers (4) coupled to photosensors (2) on both WLS fiber ends, while the other of the larger scintillator surface is covered by the reflector (5). The thinner edge surfaces of the scintillator can be covered (right) or uncovered (left) with photosensors (2).

FIG. 8: In this figure we show another embodiment, in which one of the larger scintillation surfaces of at least one detector module is covered with WLS fibers (4) coupled to photosensors (2) on one WLS fiber ends, while the other of the larger scintillator surface is covered by a faceplate (6) optically coupled between the reflector (5) and the scintillator face. The thinner edge surfaces of the scintillator can be covered (right) or uncovered (left) with photosensors (2).

FIG. 9: In this figure we show another embodiment, in which one of the larger scintillation surfaces of at least one detector module is covered with WLS fibers '(4) coupled to photosensors (2) on both WLS fiber ends, while the other of the larger scintillator surface is covered by a faceplate (6) optically coupled between the reflector (5) and the scintillator face. The thinner edge surfaces of the scintillator can be covered (right) or uncovered (left) with photosensors (2).

FIG. 10: In this figure we show an embodiment of the invention for PET applications where the detector modules (3) form concentric cylinders surrounding the object under study. Ten detector module layers can be seen and each layer is composed of an increasing number of "detector modules" as we move away from the center in order to achieve a closed geometry. An essential feature is that the distance among the layers be sufficient so that the accuracy in the TOF mesaurement alllows to distinguish the timing sequence of the impacts ("interactions") produced by a single incident gamma ray ("event").

The dimensions (D, d, H, and h), including the number of layers of the device can be adjusted for the different applications. Detector modules can include WLS (4) coupled to photosensors (2) as showed in FIG. 4 and/or reflector (5)/faceplates (6) as showed in FIGS. 5-9.

The annular structure allows for fully coverage of the desired field-of-view, while the number of layers allows for high detection efficiency of the 511 keV gamma ray. The dimensions (D, d, H, and h), including the number of layers of the device can be adjusted for the different applications. In a preferred embodiment the layers of detector modules (3) comprise $LaBr_3(Ce)$ about 3 mm thickness separated roughly 3 cm between each other. In this case, a time-of-flight resolution of 80 ps is assumed in order to distinguish sequentially the different Compton interactions in the module detector layers. In FIG. 10, detector modules can include WLS (4) coupled to photosensors (2) as showed in FIG. 4, to efficiently increase the amount, of the light collected and/or reflector (5)/faceplates (6) optically coupled to the larger scintillator faces not covered by WLS (FIGS. 5-9). The amount of collected light is directly related with the energy and time resolution, Good energy resolution is crucial for accurate determination of Compton cone angle (FIG. 1, eq. 1). Compton cone angle in PET will be used to reject scatter events inside the body to be examined and random events that produce coincidence events in time by chance (FIG. 11).

FIG. 11: In a PET application of the invention true coincidence events can be properly managed, no matter if they have suffered scatter in the body or in the detector module. Up: True coincidence event in which both gamma rays whose initial energy was E0=511 keV, produced a Compton interaction inside the detector. The gamma ray going downward (upward) interact at t1(t3) by depositing energy E1(E3) and the scattered gamma ray interact at t2(t4) depositing energy E2(E4). In current PET scanners this event would be discarded as there is no way to know the actual timing sequence and consequently the LOR can not be univocally determined. Notice that both cones of possible original gamma ray directions intersect with the LOR. Down Left: Coincidence event in which one of the gamma rays has suffered scatter inside the human body. These events produce noise at the image due to the fake LOR (8) that results in joining with a straight line the two interaction points in the detector. In current PET scanners these events are rejected purely based on energy information. The present invention allows for a much more efficient rejection of these events based on careful analysis of the event: none of both Compton cones intersect with the fake LOR (8), Down Right: Random coincidence event in which two positron interactions coincide in time by chance. Careful analysis of the event also allows rejection of random events, in these cases, determination of the true LOR (9) is also possible.

The invention claimed is:

1. A gamma ray Compton TOF camera system comprising a plurality of detector modules, each detector module comprising a gamma radiation sensitive material, said detector modules are arranged in layers formed by individual detector modules, or by sets of detector modules, said layers are placed in such a way that they interfere an incoming gamma ray, in order to completely or partially absorb it after one or more Compton interactions, and are spatially separated in order to allow for the determination of the temporal order of each gamma ray interaction inside the camera system, read out electronics and Data Acquisition System where signals coming from the detector modules will be readout, digitized and sent to a processing unit for further analysis, and that is capable to obtain the 3D position, the energy and the temporal sequential order of the individual interactions—Compton and photoelectric-produced by a single incident gamma ray, allowing the determination of the full timing sequence of all gamma ray interactions inside a gamma ray detector volume.

2. The system according to claim 1, wherein at least one detector module comprises scintillation crystal as gamma radiation sensitive material, optically coupled to arrays of photosensors.

3. The system according to claim 2, wherein the photosensors are coupled to the scintillation crystal through at least one of a plurality of thinner side surfaces of each scintillation crystal.

4. The system according to claim 2, wherein the scintillation crystal is a monolithic scintillation crystal.

5. The system according to claim 4, wherein the monolithic scintillation crystal is selected from organic crystal scintillator, inorganic crystal scintillator, liquid scintillator, gas scintillator or combination of them for the different detector modules.

6. The system according to claim 4, wherein the monolithic scintillation crystal is selected from $LaBr_3(Ce)$ or liquid Xe or combination of them for the different detector modules.

7. The system according to claim 2, wherein the scintillation crystal is a pixelated scintillation crystal.

8. The system according to claim 2, wherein the scintillation crystal is a combination of pixelated scintillation crystal for at least one detector module and at least one monolithic scintillation crystal for at least another one of the detector modules.

9. The system according to claim 2, wherein the photosensors are arrays of silicon photomultipliers (SiPms), single photon avalanche diodes (SPADs), digital SiPms, avalanche photodiodes, position sensitive photomultiphers, photomultipliers, phototransistors, photodiodes, photo-ICs or combinations of them, for the different detector modules.

10. The system according to claim 2, wherein at least one of the detector modules comprises Wave Length Shifter (WLS) fibers coupled to one or several of its scintillator surfaces to drive the light from the scintillator crystal towards the photosensors.

11. The system according to claim 2, wherein at least one of the detector modules has at least one larger scintillator surface optically coupled to a reflector surface.

12. The system according to claim 11, wherein at least one of the detector modules has a faceplate optically coupled between the reflector surface and the at least one larger scintillator surface.

13. The system according to claim 11, wherein the reflector surface in at least one of the detector modules is selected between a retroreflector and a light absorbing surface.

14. The system according to claim 2, wherein the detector modules include at least two larger scintillator surfaces and wherein at least one of the detector modules has one of its larger scintillator surfaces covered with WLS fibers coupled to photosensors on one or both WLS fiber ends, while the opposite larger scintillator surface is coupled to a reflector surface.

15. The system according to claim 2, wherein the detector modules include at least two larger scintillator surfaces and wherein at least one of the detector modules has one of its larger scintillator surface covered with WLS fibers coupled to photosensors on one or both WLS fiber ends, while the other one of the larger scintillator surface is covered by a faceplate optically coupled between a reflector and the scintillator face.

16. The system according to claim 1, wherein at least one of the detector modules are made of solid state detector.

17. The system according to claim 1, wherein at least one of the detector modules comprise Cherenkov radiators as gamma radiation sensitive material.

18. A device for imaging gamma ray sources comprising a gamma ray Compton TOF camera system comprising
a plurality of detector modules, each detector module comprising a gamma radiation sensitive material,
said detector modules are arranged in layers formed by individual detector modules, or by sets of detector modules, said layers are placed in such a way that they interfere an incoming gamma ray, in order to completely or partially absorb it after one or more Compton interactions, and are spatially separated in order to allow for the determination of the temporal order of each gamma ray interaction inside the camera system,
read out electronics and Data Acquisition System where signals coming from the detector modules will be readout, digitized and sent to a processing unit for further analysis, and that is capable to obtain the 3D position, the energy and the temporal sequential order of the individual interactions—Compton and photo-electric-produced by a single incident gamma ray, allowing the determination of the full timing sequence of all gamma ray interactions inside a gamma ray detector volume.

19. The device according to claim 18, that is a Positron Emission Tomography device.

20. The device according to claim 19, that is a Positron Emission Tomography device wherein the detector modules form concentric cylinders.

21. The device according to claim 18, that is a Single Photon Emission Computed Tomography device.

22. The device according to claim 18, that is a Positron Emission Tomography wherein the detector modules form concentric cylinders surrounding an object under study.

23. A method for obtaining images by nuclear techniques comprising detecting and processing radiation with a gamma ray Compton TOF camera system comprising
a plurality of detector modules, each detector module comprising a gamma radiation sensitive material,
said detector modules are arranged in layers formed by individual detector modules, or by sets of detector modules, said layers are placed in such a way that they interfere an incoming gamma ray, in order to completely or partially absorb it after one or more Compton interactions, and are spatially separated in order to allow for the determination of the temporal order of each gamma ray interaction inside the camera system,
read out electronics and Data Acquisition System where signals coming from the detector modules will be readout, digitized and sent to a processing unit for further analysis, and that is capable to obtain the 3D position, the energy and the temporal sequential order of the individual interactions—Compton and photo-electric-produced by a single incident gamma ray, allowing the determination of the full timing sequence of all gamma ray interactions inside a gamma ray detector volume.

\* \* \* \* \*